United States Patent [19]

Lynch et al.

[11] Patent Number: 5,627,539
[45] Date of Patent: May 6, 1997

[54] BIDIRECTIONAL SIGNALLING MECHANISM FOR INTERFACING COMPUTING DEVICES TO THE ANALOG TELEPHONE NETWORK

[75] Inventors: John Lynch, San Jose; James B. Nichols, San Mateo; Mark Devon, San Jose, all of Calif.

[73] Assignee: Apple Computer, Inc., Cupertino, Calif.

[21] Appl. No.: 635,789

[22] Filed: Apr. 22, 1996

Related U.S. Application Data

[63] Continuation of Ser. No. 180,925, Jan. 11, 1994, abandoned.
[51] Int. Cl.[6] .................................................. H03M 1/12
[52] U.S. Cl. .................................................. 341/155
[58] Field of Search ........................... 341/155, 59, 63, 341/90, 98

[56] References Cited

U.S. PATENT DOCUMENTS 5,117,452  5/1992  Callele et al. ........................... 379/98

*Primary Examiner*—Brian K. Young
*Attorney, Agent, or Firm*—Burns, Doane, Swecker & Mathis, L.L.P.

[57] ABSTRACT

A signalling mechanism is used by a telecom adapter for interfacing a telephone line to a computer so as to exchange signalling information, such as pulse dialing information, ring indication information, or both. In accordance with one embodiment, the telephone line is sampled to produce a series of data samples. A signal is produced indicative of whether or not a ring signal is currently present on the telephone line, and the signal is combined with at least one of the samples in a single data unit. The single data unit is then transmitted to the computer. In another embodiment, a single data unit is received from the computer and separated into a data sample position and a pulse dialing control position. In one mode of operation the data sample position is converted to an analog signal; in another mode of operation, pulse dialing control position of the single data unit is used to perform pulse dialing. By transmitting the single data unit containing the ring indication signal to the computer and contemporaneously receiving the single data unit containing the pulse dialing (on-hook/off-hook)control signal in respective independent data streams an efficient bidirectional signalling mechanism is achieved, greatly simplifying pulse dialing and ring detection and allowing for relatively every compliance with international standards and regulations.

14 Claims, 9 Drawing Sheets

ISDN TELECOM ADAPTOR INITIALIZATION

FIG. 8 TRANSMIT HANDSHAKE (GPi) TIMING

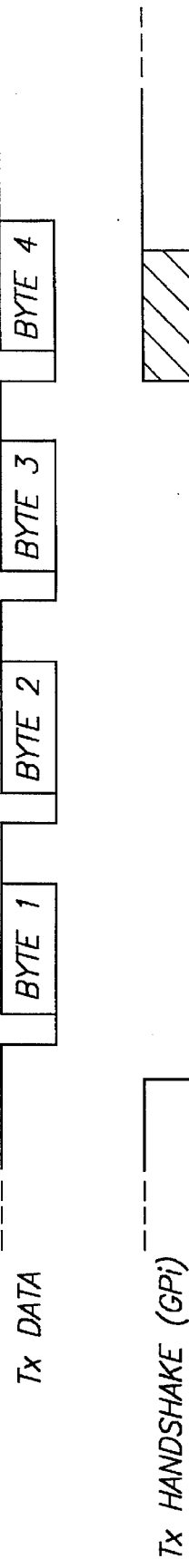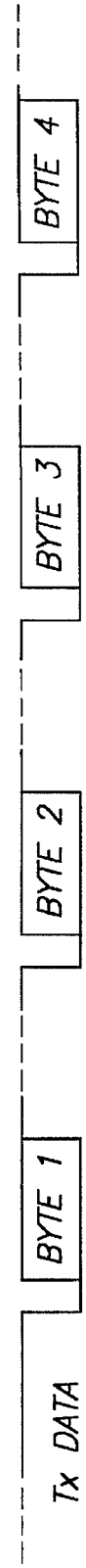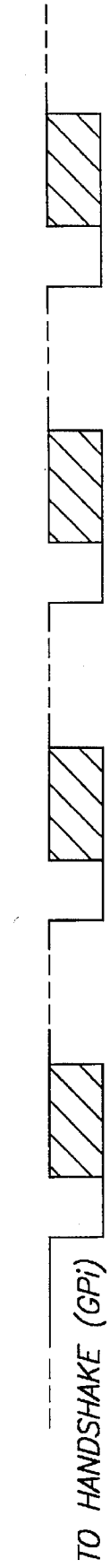
FIG. 9
BLOCK AND SINGLE BYTE TRANSFER MODES

BIDIRECTIONAL SIGNALLING MECHANISM FOR INTERFACING COMPUTING DEVICES TO THE ANALOG TELEPHONE NETWORK

RELATED APPLICATION

This application is a continuation-in-part of U.S. application Ser. No. 08/078890, entitled *Telecom Adapter for Interfacing Computing Devices to the Analog Telephone Network*, filed May 10, 1993.

This application is a continuation, of application Ser. No. 08/180,925, filed Jan. 11, 1994 now abandoned.

BACKGROUND OF THE INVENTION

1. Field of the Invention

The present invention relates to data telecommunications and more particularly to data telecommunications over the wide-area analog telephone network.

2. State of the Art

The analog telephone network by its nature uses analog electrical signalling over copper wire between a central office and customer telephone sets. Computer communications, being based on digital signalling, require an analog to digital conversion to be performed in order to support digital communications over the analog phone network. This conversion is typically done by a modem (modulator/demodulator). This approach is adequate for basic digital data communications, and has been employed for the last several decades. A typical modem consists of a digital signal processor (DSP), a hybrid 2/4 wire interlace, a codec, a microcontroller to manage system functions, and a serial interface to the computer, typically using the RS232C signalling approach with ASCII encoding.

There are significant disadvantages to this approach. By embedding the entire communications and signal processing functionality in an external device, a lower bound is placed on the cost of the device. Furthermore, the RS232C/ASCII signalling convention precludes access to non-digital (analog) signals that may be carried on the telephone network. Direct access to a digital representation of the analog channel is required for voice recognition, text-to-speech conversion, proprietary encoding of video signals, and other related technologies. Finally, conventional modems do not allow for adaptation to the various international telephone standards, requiring instead replacement of the entire modem.

SUMMARY OF THE INVENTION

The present invention, generally speaking, provides a signalling mechanism for use by a telecom adapter for interfacing a telephone line to a computer so as to exchange signalling information, such as pulse dialing information, ring indication information, or both. In accordance with one embodiment of the invention, the telephone line is sampled to produce a series of data samples. A signal is produced indicative of whether or not a ring signal is currently present on the telephone line, and the signal is combined with at least one of the samples in a single data unit. The single data unit is then transmitted to the computer. In another embodiment, a single data unit is received from the computer and separated into a data sample portion and a pulse dialing control portion. In one mode of operation the data sample portion is converted to an analog signal; in another mode of operation, the pulse dialing control portion of the single data unit is used to perform pulse dialing. By transmitting the single data unit containing the ring indication signal to the computer and contemporaneously receiving the single data unit containing the pulse dialing (on-hook/off-hook) control signal in respective independent data streams, an efficient bidirectional signalling mechanism is achieved, greatly simplifying pulse dialing and ring detection and allowing for relatively easy compliance with international standards and regulations.

BRIEF DESCRIPTION OF THE DRAWINGS

The present invention may be further understood from the following description in conjunction with the appended drawings. In the drawings:

FIGS. 6–9 illustrate a procedure used to guarantee time-reference synchronization between the computer system and the telecom adapter;

DETAILED DESCRIPTION OF THE PREFERRED EMBODIMENTS

Figure 1:
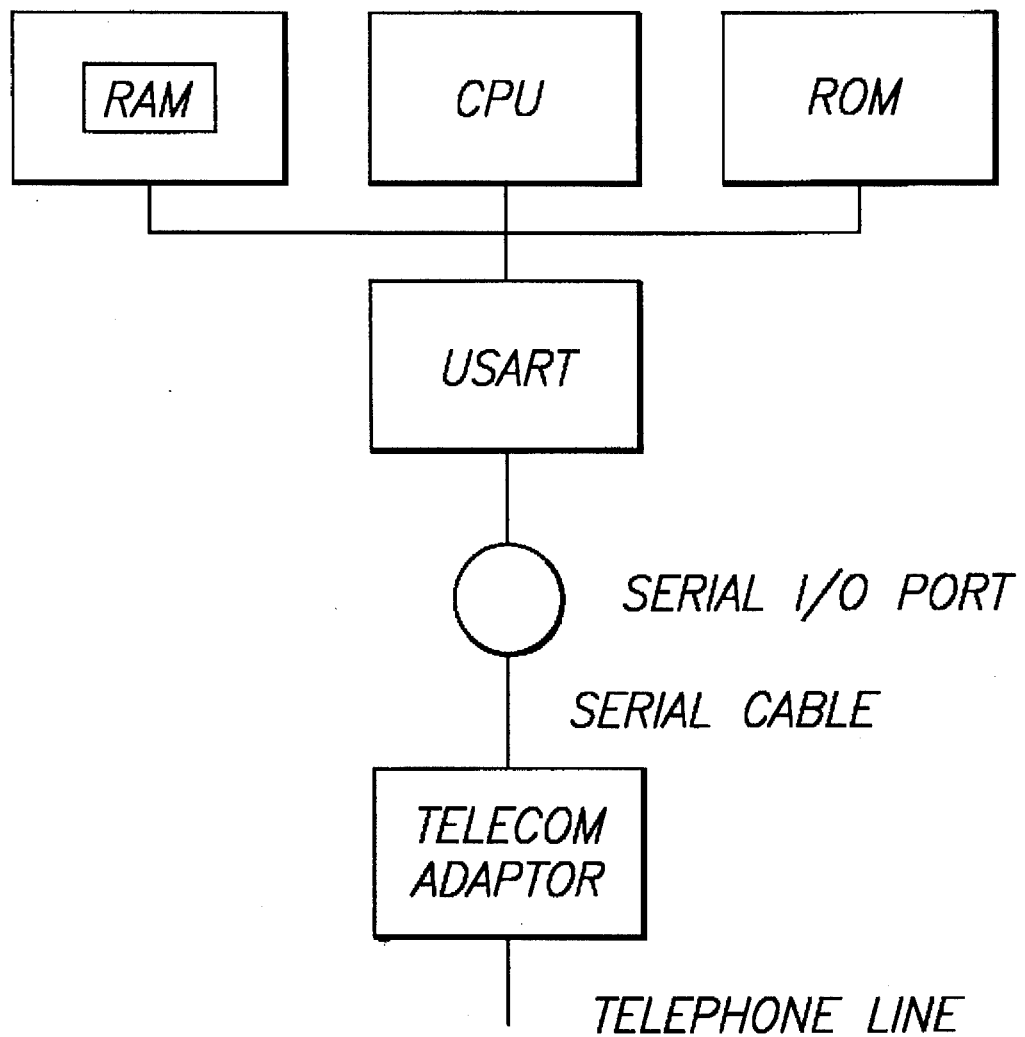
FIG. 1 is a simplified block diagram of a computer system in which the present invention may be used.

The computer system of FIG. 1 is exemplary of a wide variety of computer systems, both large and small, in which serially-connected communications devices may be found and with which the present telecom adapter may be used. An address bus and a data bus connect a central processing unit (CPU) to read-only memory (ROM), and, through bus transceivers, to random-access memory (RAM) and to a UART (universal asynchronous receiver transmitter) or a USART (universal synchronous/asynchronous receiver transmitter) that provides an interface to a serial I/O port(s). A telecom adapter is shown connected to the serial port.

Figure 2:
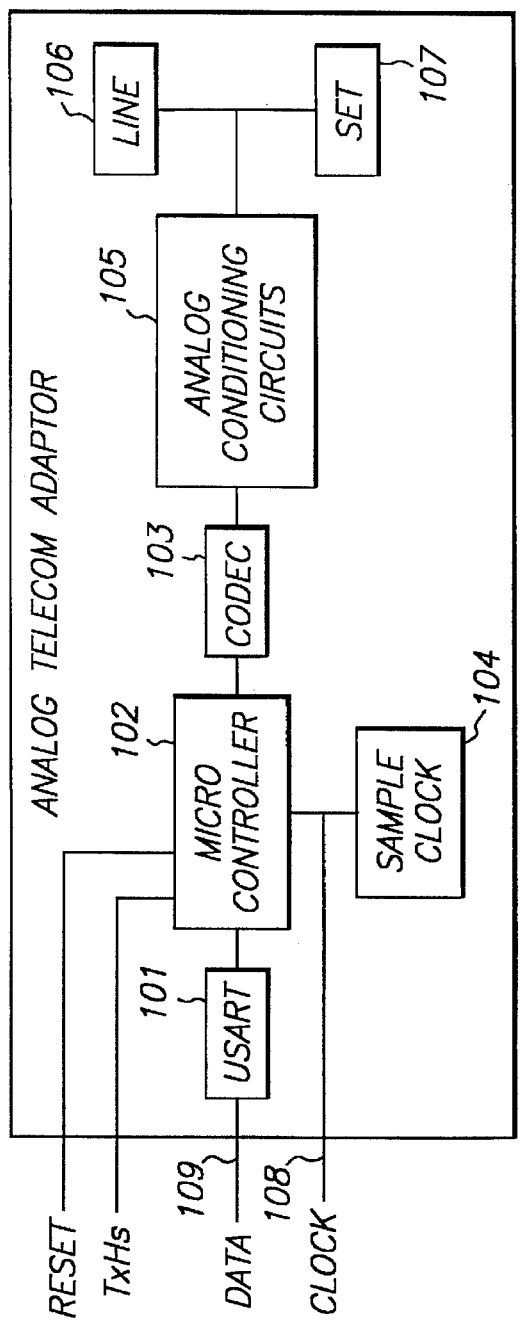
FIG. 2 is a block diagram of a telecom adapter in accordance with the present invention.

The present telecom adapter provides a versatile, general-purpose interface to the wide-area communications analog telephone network. Referring to FIG. 2, the telecom adapter contains analog to digital conversion facilities (103), electrical and mechanical interface hardware (105), clock generation and/or recovery circuits (104), serial-to-parallel translation hardware (101) to exchange the digital data between the telecom adapter and host computer; and a state machine (microcontroller 102) which manages the synchronization and delivery of digital samples to the host via a time-division-multiplexed data stream. The analog data streams are derived from signals from the telephone channel (106) and a standard telephone desk set (107).

A serial interface protocol and procedure is defined for attaching the telecom adapter through a short cable to a standard communications port, example the serial port, of a computer workstation. The computer workstation is assumed to be equipped with direct memory access (DMA) whereby DMA may be used to service the serial port and off-load the computer's central processing unit (CPU), allowing continuous real time communications to be maintained. A related protocol and procedure, described in U.S. application Ser. No. 08/058,750 filed May 7, 1993, incorporated herein by reference, enables non-DMA capable computers to establish through the serial port a high-speed communications link to digital networks including the Integrated Services Digital Network (ISDN) and Private Branch Exchanges(PBX) networks, using a more advanced telecom adapter.

Referring still to FIG. 2, the external telephone network connects to the telecom adapter at jack (106). This signal is then conditioned by a suitable electrical interface to provide proper signal amplification and filtering before submission to the codec (digitizer) interface (103). The codec is clocked by an internally generated oscillator (104). This oscillator is also used to derive the telecom sample clock (108) that is delivered to and employed by the host for datastream synchronization as explained hereinafter. Digitized samples are clocked between host and telecom adapter bit-synchronously and in phase with sample generation in the telecom adapter. Thus no buffering of digital data within the telecom adapter is required.

Using full-duplex DMA hardware in the computer, a time-division-multiplexed (TDM) interface may be supported. A transmit handshake line (110) is provided on the serial interface as shown in FIG. 2. When the telecom adapter wishes to exchange a set of data from a continuous bit rate (CBR) real time data stream with the computer, it simply transmits any bytes to be transmitted to the computer and then uses the transmit handshake line (110) to force the computer to transmit the appropriate number of bytes to the telecom adapter. In this way, the constant bit rate stream can be maintained without any intervention by the computer's CPU. Because the telecom adapter is directly servicing the source of the stream, namely the communications line, the telecom adapter is better able than the computer to maintain the timing of the constant bit rate stream.

Figure 3:
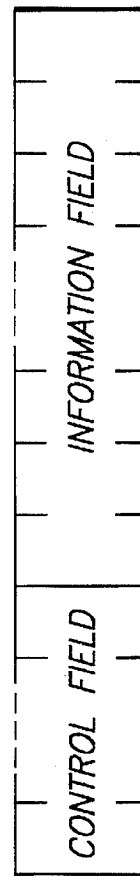
FIG. 3 is a diagram of a typical time-division-multiplex data stream.

Control of the telecom adapter through the TDM interface is performed by a software telecom adapter handler routine in the computer. Typically, TDM data streams are broken up into fixed length frames consisting of a control field and a data field as shown in FIG. 3. The control field carries adapter dependent information, and the information field carries the data. These frames are repeated at a fixed period of time, called the frame period. The control field is used by the software handler to set up data buffers for these frames. The specifics of the control field depend on the specific hardware implementation of the telecom adapter.

Figure 4:
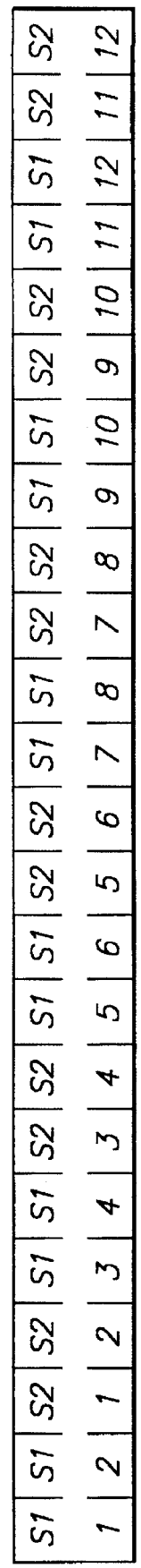
FIG. 4 is a diagram of a possible information field data frame of the data stream of FIG. 3.

The information field of the TDM frame consists of an integral number of interleaved sets of data for, in the case of the analog telephone network, each of two data streams. The number bytes in each set for a stream is called the stream's interleave factor (IF). A possible frame for the telecom adapter of FIG. 2 is shown in FIG. 4 in which two streams are interleaved, each with an interleave factor of two.

Each stream in the information field is characterized by three parameters: the interleave factor, or the number of bytes in each occurrence of the stream, the offset, or the number of bytes into the information field that the first byte of the stream occurs, and the repeat factor—the offset between the first byte of one occurrence of the stream and the first byte of the next occurrence of the stream. For example, in FIG. 4, Stream 2's interleave factor is two, its offset is one, and its repeat factor is two.

Providing for the exchange of digital real time data streams between various components of the host system and the telephone network enables interworking of the host computer within a larger, possibly global, network of computers. Typical computer subsystems would include, but are not limited to, sound generation, audio recording, video, and so on. In all cases, the host subsystem data stream that exchanges data with the telecom adapter must be phase-synchronized with the telecom data stream.

Figure 5:
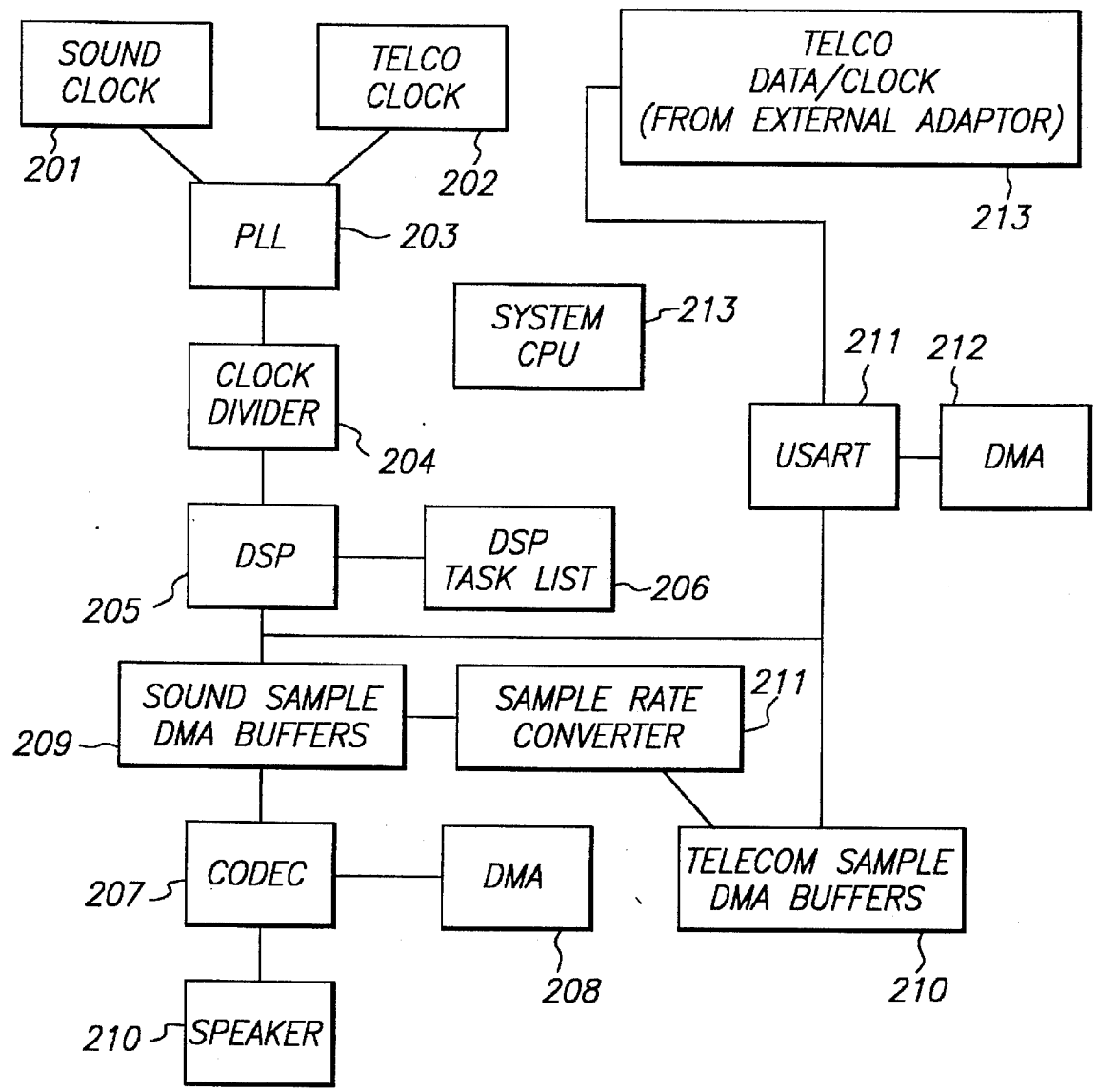
FIG. 5 is a block diagram of a data stream synchronization arrangement.
Figure 6:
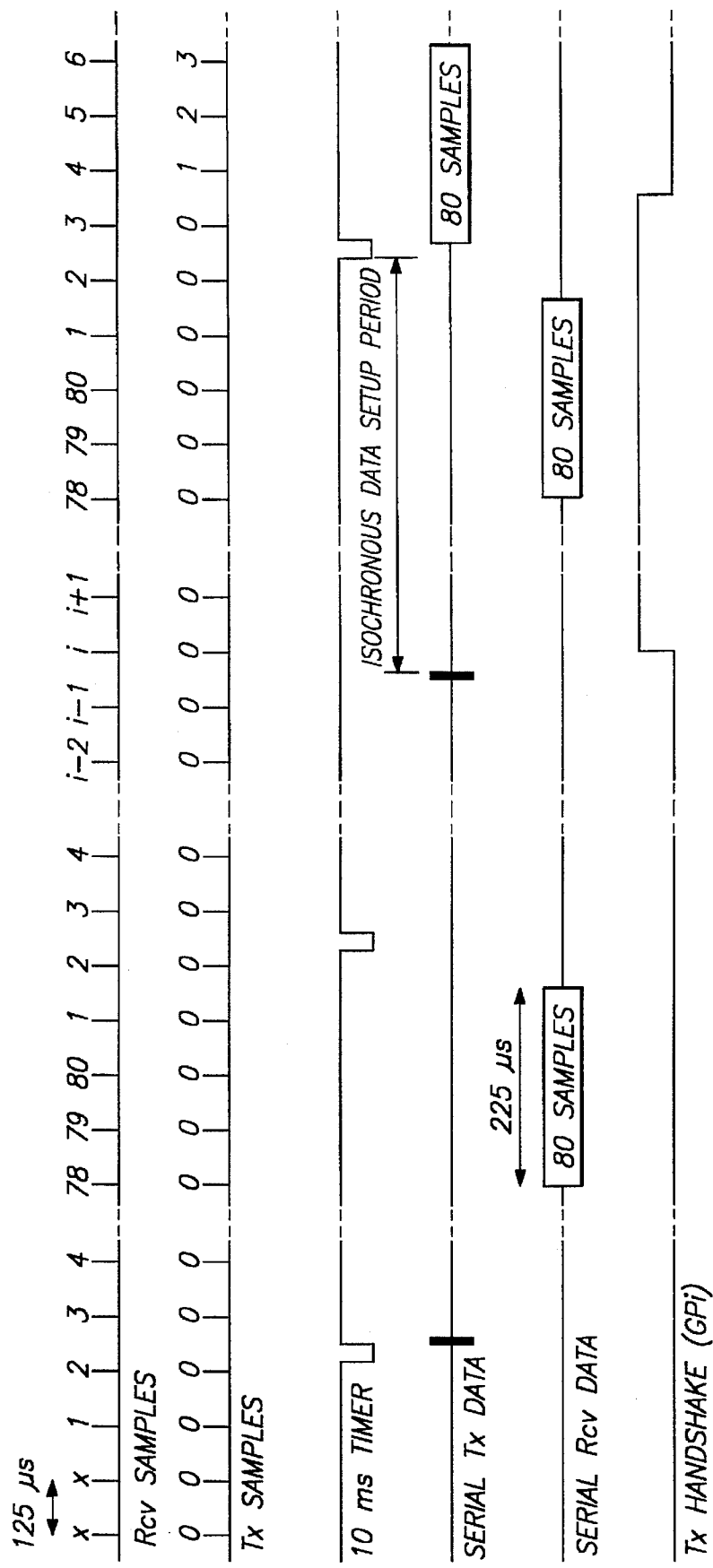
Figure 7:
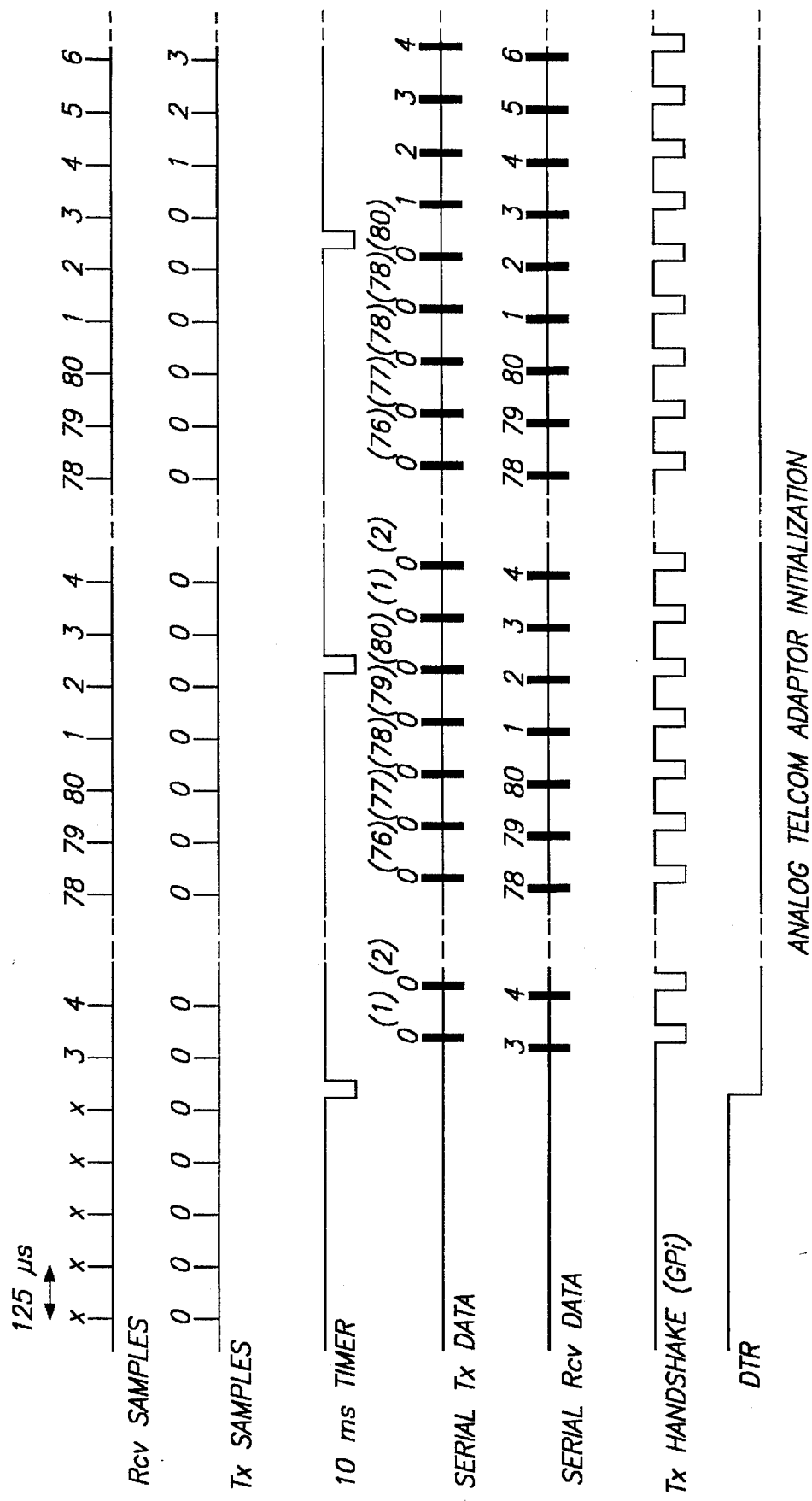
Figure 8:
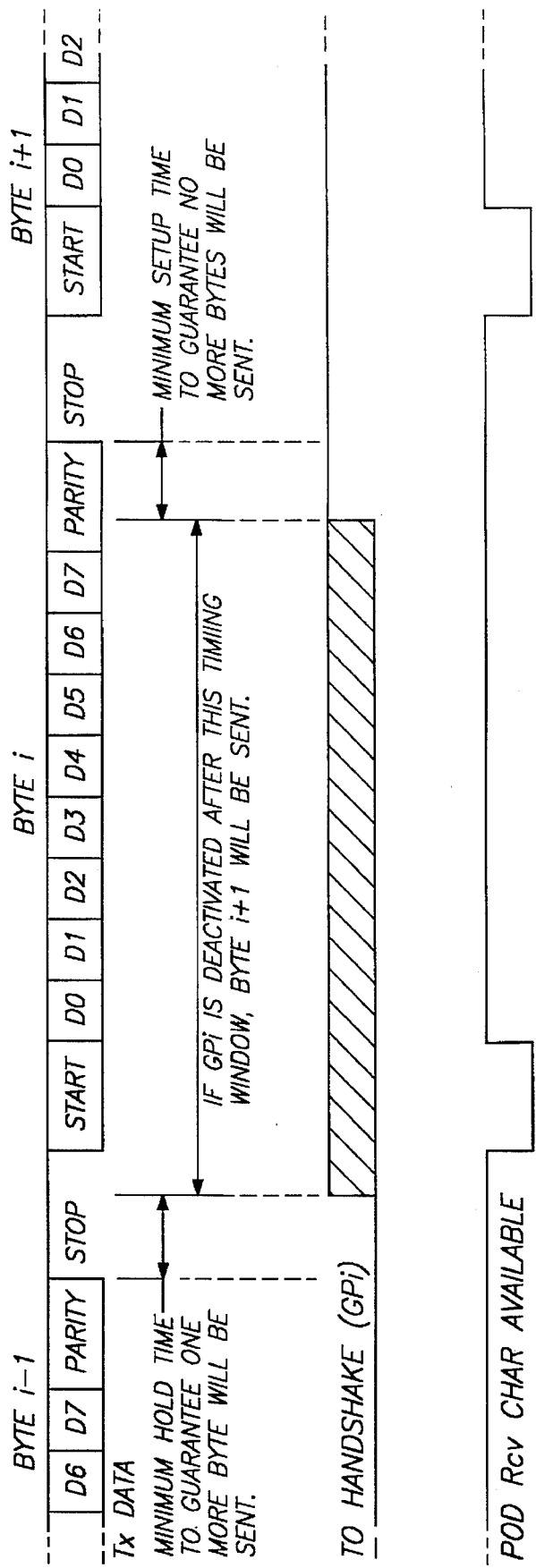

A procedure for initialization and operation of the telecom adapter by the host computer, to be described presently in relation to FIG. 5, allows wide-area communications data streams obtained from analog telephone lines to be conveniently manipulated and blended into the computer sound facilities, for example. The host computer contains signal processing resources useful for generation and detection of voice-band data signals (modem), speech generation, voice recognition, sound synthesis, and the like. The procedure ensure that a precise integer relationship is maintained between telecom data and the particular subsystem of interest, such that the host interlace subsystem data stream is time-aligned with the telecom adapter data stream.

Referring to FIG. 5, the host computer system typically employs a CISC (complex instruction set) microprocessor as the central processor (213). However, contemporary CISC processors by their nature lack sufficient processing capacity to treat the digital telecom adapter datastream in real-time. For example, a V.32 analog modem signal could not be generated and delivered to the telecom adapter by the CISC CPU. Therefore, a Digital Signal Processor (DSP) (205) is employed as a coprocessor to perform the laborious but requisite signal transformation computations on the telecom data stream.

The DSP is a general purpose resource at the disposal of potentially several host computer clients. The host computer operating system software therefore employs a time-based software scheduling algorithm to ensure its clients of reasonable access to the DSP processing resources. The time-based scheduling concept is based on a list of tasks (206) that are defined by the host processor, and executed in a sequential manner on the DSP. The time-base atomic unit is called a frame. For this reason the time-based scheduling system is also called a frame-based signal processing system.

Operation of the telecom adapter is as follows. The bit-synchronous clock (108) and bidirectional datastreams are delivered to the host computer on the serial interface (213). The serial data is clocked into a serial-to-parallel converter (211) according to the transitions of the bit-synchronous clock. Since the datastream is real-time, continuous, and must be delivered reliably, regardless of tasks that may be running on the central processor (213), a dedicated Direct Memory Access (DMA) channel (212) is used. The DMA circuit moves data between the Telecom Sample Buffers (210) and the telecom adapter.

At the same time, the DSP (205) may be executing a parallel time-based task such as sound synthesis over the system speakers. In this case the speaker (210) is driven by a codec (207) from the sound sample buffers (209) which are filled as a result of computations made by the DSP. Again, since the datastream is real-time synchronous, a DMA channel is dedicated to the sound system to ensure reliable transfer of the sound samples to the speaker.

In order to provide the reliable exchange of sample data between the host computer sound system and the telecom adapter, the sound sample buffer must maintain a fixed phase and time relationship with the telecom sample buffer. Note that, at the same time, the DSP operates according to a time-based scheduling algorithm. Therefore the following procedure is implemented. First, the telecom clock, which was previously shown to be bit-synchronous and in phase with the datastream delivered by the telecom adapter, is delivered to the host computer USART (211) and a Phase-Locked Loop (203). The telecom data clock is used to synchronize the sound clock (201) which nominally operates at an integer multiple of the telecom data clock. Thus the sound clock is phase-aligned with the telecom data clock.

The output of the PLL is then passed to a clock divider (204) which reduces the clock frequency to yield a periodic pulse. This periodic pulse defines the DSP time frame and is used to awaken the DSP and cause it to execute the task list. The tasks are executed repetitively according to the periodic pulse, which has a nominal period of ten milliseconds. Included in the task list are the sound generation task(s), the telecom sample processing task(s), and a sample rate conversion task. The purpose of the sample rate converter (211) is to transform the N samples found in the telecom sample buffer into M samples loaded into the sound sample buffer by the DSP. However, there must be a strict time alignment between the sound buffer and the telecom sample buffer. Therefore, the telecom adapter is initialized in precise reference to the output of the clock divider (204).

The telecom adapter has a reset line (111) which is driven by the host computer. The reset line holds the telecom data and clock lines in a quiescent state, when asserted. The clock line is activated, and sampling commences, when the reset line is de-asserted. A procedure illustrated in FIGS. 6–9 is executed by the System CPU (213) whereby the output of the clock divider is monitored, such that the telecom adapter reset input is asserted and released at the appropriate time to guarantee time-reference synchronization.

After the initialization sequence is executed, data is delivered from the telecom adapter to the host computer with both phase and time alignment. Therefore the DSP, which is time scheduled for frame-based processing, is assured that the N telecom samples, which arrive from the telecom adapter via the system DMA hardware, are entirely coincident with the generation of the M sound samples contained in the sound sample DMA buffer. Although the DSP's primary task is modulation/demodulation, the capabilities of the DSP may be used to further advantage to achieve truly global connectivity over the worldwide analog telephone network using a single design.

The telephone networks in the various countries of the world each have their own different standards and regulations. Telephone equipment for use with the telephone network in a particular country must be certified as complying with network standards. Particularly with respect to ring indication and pulse dialing, the standards of various countries are disparate and in some cases quite stringent.

The conventional response to the need for country-by-country certification has been to create from one core design a multiplicity of different designs, one for each of the different countries, each design having its own peculiar hardware. Such an approach is not only costly but less than satisfactory. Business travelers, for example, are unable to use a single device for digital communications throughout the world, but instead must use different devices depending upon their particular location at a particular time.

Pulse dialing, although no longer prevalent in the U.S., is prevalent in other countries of the world, notably Japan. Most existing analog networks, however, support pulse dialing. Call establishment using pulse dialing requires strict timing conventions to be followed. Pulse dialing has traditionally been implemented using a mechanical apparatus. More recent telephone equipment typically employs a dedicated relay under control of a microcontroller.

Ring detection, on the other hand, is typically performed using analog circuitry. Analog circuitry used to derive the "ring indication" signal typically employs classical analog components to perform the necessary filtering, integration and discrimination functions. A telecom device must perform accurate ring detection in order to detect and reject false ring signals.

The present telecom adapter permits both accurate pulse dialing and precise qualification (discrimination) of the ring indication signal, providing maximum performance and functionality with minimal hardware requirements.

An important recognition is that the dynamic range of an analog telephone system is not compromised by using, instead of 16-bit/sample quantization, 15-bit/sample quantization. In mu-law-to-linear sample conversion, for example, the least significant bit of the mu-law sample typically does not affect the final linear sample value. The least significant bit of the 16-bit word may therefore be used to convey the pulse dial and ring indication signals in a manner illustrated in FIG. 10. The digital ring indication is delivered to the host with high resolution (125 µs sample resolution), allowing the DSP to efficiently detect and reject spurious ring indication signals.

Figure 10:
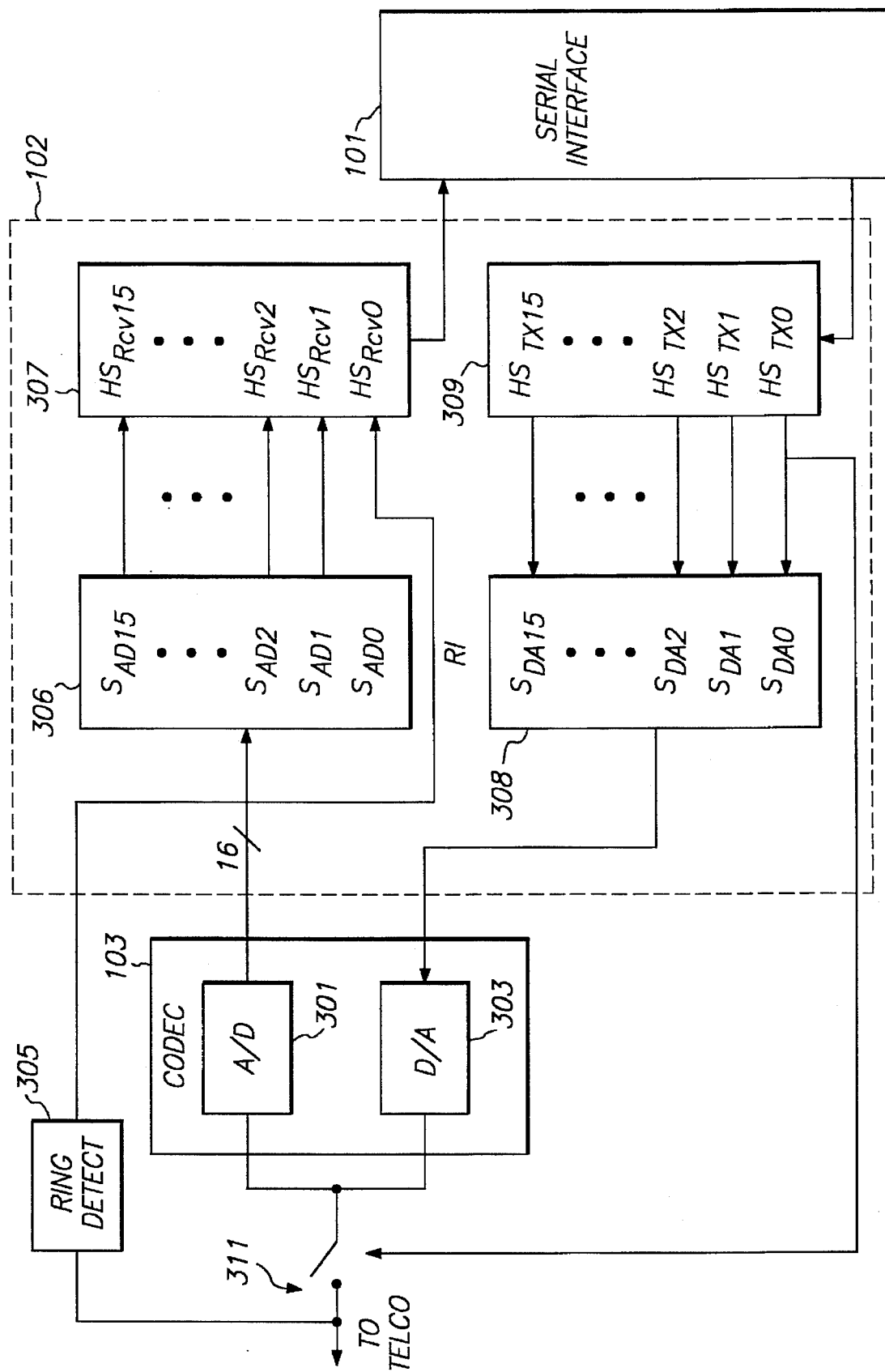
FIG. 10 is a block diagram showing in greater detail the data flow inside the telecom adapter of FIG. 2.

Referring to FIG. 10, the manner in which the least significant bit of the 16-bit word is used to convey pulse dial and ring indication signals may be appreciated in greater detail. In FIG. 10, like reference numerals refer to like elements as in FIG. 1. The serial interface 101 is connected bidirectionally to the microcontroller 102, which is connected bidirectionally to the codec 103. The codec connects to the telephone line through analog conditioning circuits (not shown in FIG. 10). The codec functions to sample the incoming telephone line signal using A/D conversion circuitry 301 and, using D/A conversion circuitry 303, to convert digital samples from the host into an analog signal for transmission over the telephone line. The codec is connected to the telephone line through a relay 311 as explained more fully below.

A/D-converted samples from the codec 103 are input to the microcontroller 102, and samples for D/A conversion in the codec are input from the microcontroller. The analog telephone line is input separately to the microcontroller, to a ring detect circuit 305.

Blocks 306 and 307 and block 308 and 309 represent a manner in which samples are buffered and driven within the microcontroller 102 in the receive and transmit directions, respectively. In the receive direction, sample bits $S_{AD0}$–$S_{AD15}$ are input to the microcontroller 102 from the codec 103. The least significant sample bit $S_{AD0}$, however, is ignored. Instead of transmitting this bit to the host, an output signal produced by the ring detect circuit 305 is combined with sample bits $S_{AD1}$–$S_{AD15}$ to form two bytes of host serial receive data, $HS_{RCV0}$–$HS_{RCV15}$. These two bytes are input to the serial interface 101, where they are serialized and transmitted to the host.

In the opposite direction, in a pulse-dialing mode, the DSP sets the least significant bit of each sample transmitted from the host to the telecom adapter appropriately so as to control the relay 311 in accordance with a specified timing convention. Two bytes of host serial transmit data, $HS_{TX0}$–$HS_{TX15}$, are input to the microcontroller 102 from the serial interface 101. The least significant bit $HS_{TXO}$, however, is connected so as to directly control the relay 311, bypassing the codec 103.

Figures 11A, 11B, 12:
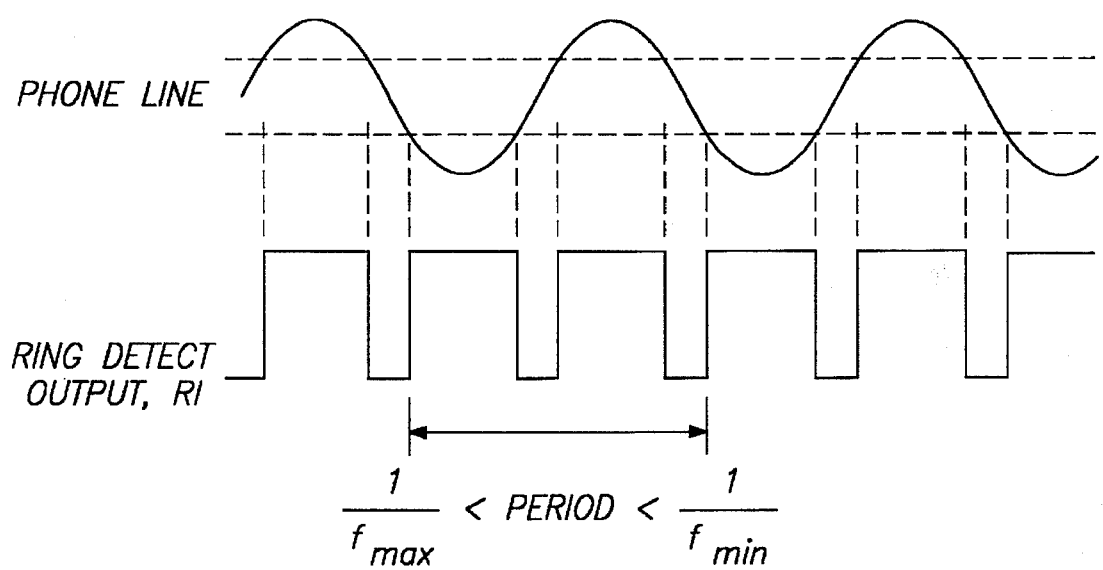
FIGS. 11a and 11b are diagrams of the format of frames exchanged between the host computer and the telecom adapter in the transmit and receive directions, respectively.
FIG. 12 is a waveform diagram illustrating a simplified method of ring detection.

The number in which "off-hook" signals for pulse dialing and ring indication signals for ring detection are incorporated into the communication streams exchanged between the host and the telecom adapter may be appreciated with reference to FIGS. 11a and 11b. FIG. 11a shows the format of a transmit frame containing samples for D/A conversion. The frame is transmitted across the serial interface as a sequence of 8-bit bytes and contains 80 samples for each of two channels, a telephone line channel and a handset channel. The samples are prefaced by two control bytes. The duration of the frame is approximately 10 ms.

Beginning with the third byte, every four bytes contains two bytes (together forming one 16-bit sample) for the telephone line and two bytes for the handset. In pulse-dialing mode, the least significant bit of the low byte of each telephone sample ($TEL_{LB}$) is set by the DSP to control the off-hook status (OH) of the telecom device so as to perform pulse dialing. In other types of platforms, the bit may be set by the host processor, for example, a RISC processor having real-time multitasking capabilities. Pulse dialing mode is indicated by a bit (PD) in one of the two control bytes, such as $CONTROL_{LB}$.

When a call has been established and there is no further need for pulse dialing, the DSP is busy calculating transmit samples, the least significant bit of which may be one or zero. To avoid the necessity of setting the least significant bit of each sample to the appropriate state in order to maintain off-hook status, pulse dialing mode is exited by setting the pulse dialing control bit PD to the appropriate state. This effectively "disconnects" the least significant bit from the off-hook relay control line. Off-hook status is then controlled on a per-frame basis using a bit of one of the control bytes. In the illustrated embodiment, the least significant bit of the second control byte is used for this purpose.

FIG. 11b shows the format of a receive frame containing A/D-converted samples to be input to the host for further processing. The frame structure is analogous to that of the transmit frame of FIG. 11a. The first two bytes contain, instead of control information, status information returned from the telecom adapter to the host. Thereafter, every four bytes contains a sample from the telephone line and a sample from the handset. The least significant bit of each telephone line sample is set in accordance with the ring indication (RI) signal from the ring detect circuit 305. The DSP processes the ring indication bits so as to efficiently detect and reject spurious ring indication signals.

Because of the capability of the DSP to process the ring indication signal, the ring detect circuitry 305 may be extremely simple. Referring to FIG. 12, a valid ring signal is specified as a signal having a specified low frequency and a specified duration. The function of the ring detector 205 in the present telecom adapter is simply to allow the DSP to determine the frequency of a periodic signal occurring on the telephone line. This function may be accomplished using a simple voltage comparator or Schmidtt-trigger device. When the signal on the telephone line rises above a first predetermined threshold, the ring indication signal is caused to go high. When the signal on the telephone low falls below a second predetermined threshold, the ring indication signal is caused to go low. The ring indication signal therefore takes the form of a pulse train. To determine whether the signal on the line is of the correct frequency to constitute a ring signal, the DSP determines the period of the pulse train and uses this period to determine whether the signal is within a narrow frequency range specified for a ring signal, in accordance with the following relation: $1/f_{max} \leq PERIOD \leq 1/f_{min}$.

Using the bidirectional signalling method described, a high degree of time-resolution (125 μs) is achieved, more than sufficient to ensure conformance with the standards established by international telecom regulatory bodies. Furthermore, the digital nature of the interface allows very simple hardware to be used to implement the dialing function. Since control and status information is blended with the codec (digitizer) datastream, additional control circuits are not required. Finally, the availability of the high-resolution ring-indication signal to the control processor allows highly reliable discrimination to be performed. Minimal cost analog circuitry may be used in the telecom adapter, achieving a universal, low-cost telecommunications port.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of the invention as defined by the following claims.

We claim:

1. For interfacing a telephone line to a computer, an apparatus comprising:
   means for sampling said telephone line to produce a series of data samples;
   detection means for detecting the presence of a ring signal on said telephone line and producing a signal indicative of whether or not a ring signal is currently present;
   means, responsive to said means for sampling and said detection means, for combining said signal with at least one of said data samples to give an encoded data sample; and
   means responsive to said means for combining for transmitting said encoded data sample to said computer.

2. The apparatus of claim 1 wherein said means for sampling comprising a codec.

3. The apparatus of claim 1 wherein said means for detecting consists essentially of a voltage comparator.

4. The apparatus of claim 1 wherein said means for transmitting comprises one of a UART and USART, including a transmit buffer.

5. The apparatus for claim 1 further comprising: means for receiving an encoded data sample from said computer;
   means for separating said encoded data sample into a data sample portion and a pulse dialing control portion;
   means for, in one mode of operation, converting said data sample portion to an analog signal; and
   pulse dialing means connected to said telephone line for, in another mode of operation, performing pulse dialing in response to said pulse dialing control portion of said encoded data sample.

6. The apparatus of claim 5 wherein said pulse dialing means consists essentially of a make/break relay.

7. For interfacing a telephone line to a computer, a method comprising:
   sampling said telephone line to produce a series of data samples;
   detecting the presence of a ring signal on said telephone line and producing a signal indicative of whether or not a ring signal is currently present;

combining said signal with at least one of said data samples to give an encoded data sample; and transmitting said encoded data sample to said computer.

8. The method of claim 7 further comprising:

receiving an encoded data sample from said computer;

separating said encoded data sample into a data sample portion and a pulse dialing control portion;

in one mode of operation, converting said data sample portion to an analog signal; and in another mode of operation, performing pulse dialing in response to said pulse dialing control portion of said encoded data sample.

9. The method of claim 8 wherein said signal indicative of whether or not a ring signal is currently present occupies a least significant bit of said encoded data sample.

10. The method of claim 8 wherein said pulse dialing control portion occupies a least significant bit of said encoded data sample.

11. For interfacing a telephone line to a computer, an apparatus comprising:

means for receiving an encoded data sample from said computer;

means for separating said encoded data sample into a data sample portion and a pulse dialing control portion;

means for, in one mode of operation, converting said data sample portion to an analog signal; and pulse dialing means connected to said telephone line for, in another mode of operation, performing pulse dialing in response to said pulse dialing control portion of said encoded data sample.

12. The apparatus of claim 11 further comprising: means for sampling said telephone line to produce a series of data samples;

detection means for detecting the presence of a ring signal on said telephone line and producing a signal indicative of whether or not a ring signal is currently present;

means, responsive to said means for sampling and said detection means, for combining said signal with at least one of said data samples an encoded data sample; and means responsive to said means for combining for transmitting said encoded data sample to said computer.

13. For interlacing a telephone line to a computer, a method comprising:

receiving an encoded data sample from said computer;

separating said encoded data sample into a data sample portion and a pulse dialing control portion;

in one mode of operation, converting said data sample portion to an analog signal; and in another mode of operation, performing pulse dialing in response to said pulse dialing control portion of said encoded data sample.

14. The method of claim 13 further comprising:

sampling said telephone line to produce a series of data samples;

detecting the presence of a ring signal on said telephone line and producing a signal indicative of whether or not a ring signal is currently present;

combining said signal with at least one of said data samples to give an encoded data sample; and transmitting said encoded data sample to said computer.

* * * * *